Oct. 25, 1960 G. W. BARNES 2,958,000
ELECTRICAL REGULATING SYSTEMS
Filed May 12, 1958 3 Sheets-Sheet 1

Inventor
G.W. Barnes
By Glascott Downing Leebvee
Attys.

Oct. 25, 1960  G. W. BARNES  2,958,000
ELECTRICAL REGULATING SYSTEMS
Filed May 12, 1958  3 Sheets-Sheet 2

Inventor
G.W. Barnes
By Glascock Downing Seebold
Attys.

United States Patent Office 2,958,000
Patented Oct. 25, 1960

2,958,000

ELECTRICAL REGULATING SYSTEMS

Geoffrey Walter Barnes, Johannesburg, Union of South Africa, assignor to Easan Electrical (Proprietary) Limited, Johannesburg, Union of South Africa Filed May 12, 1958, Ser. No. 734,461

Claims priority, application Great Britain May 14, 1957

12 Claims. (Cl. 314—69)

This invention relates to electrical regulating systems and is particularly suitable for regulating the movements of the electrodes of arc furnaces and arc-resistance furnaces operating on alternating-currents.

It is an object of the present invention to provide a relatively simple and compact electrical regulating system which may be coupled directly to the circuit of apparatus, parts of which are to be regulated, thereby avoiding the intermediate use of switches, contactors, relays, generators or amplifiers. However, amplifiers may be employed with advantage in larger installations and where it is desired to reduced power losses.

It is a further object of the present invention to provide an electrical regulating system according to the preceding paragraph which may be employed to regulate the electrodes of an arc-furnace or arc-resistance furnace thereby improving the efficiency of the furnace.

It is a still further object of the present invention to provide an electrical regulating system requiring no external source of direct-current or other power and operating on alternating-current without the need for rectifying apparatus.

Although the invention will be hereinafter described primarily with reference to arc furnaces it is to be understood that the invention is equally applicable to arc welding and arc lamps and all other devices relating to the positioning of electrodes whether involving an arc or not e.g. "submerged arc" and "arc-resistance" furnaces (which frequently have no arc), salt-bath furnaces and glass melting furnaces employing electrodes, and even liquid starters or liquid resistances.

Figure 1:
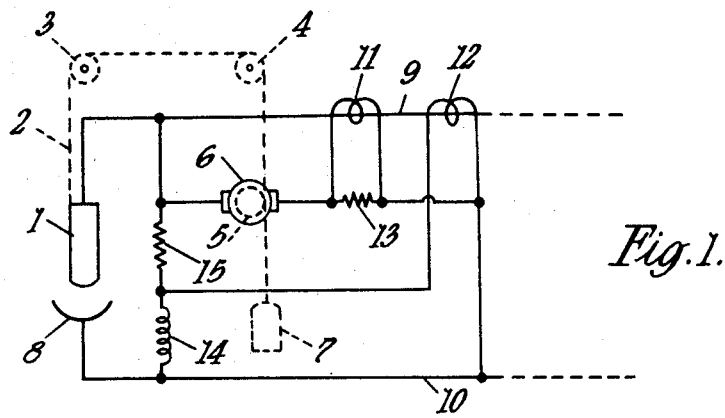
Figure 2:
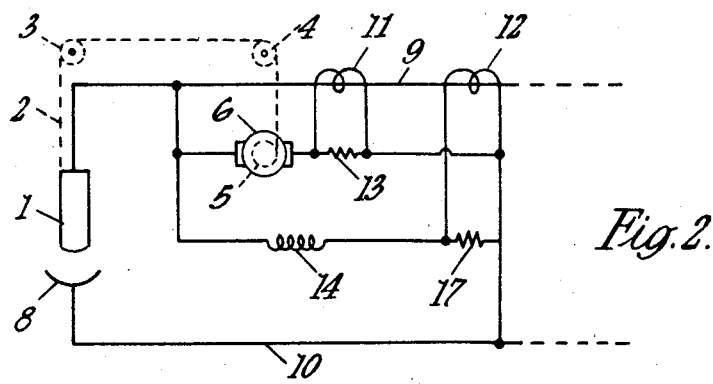
Figure 3:
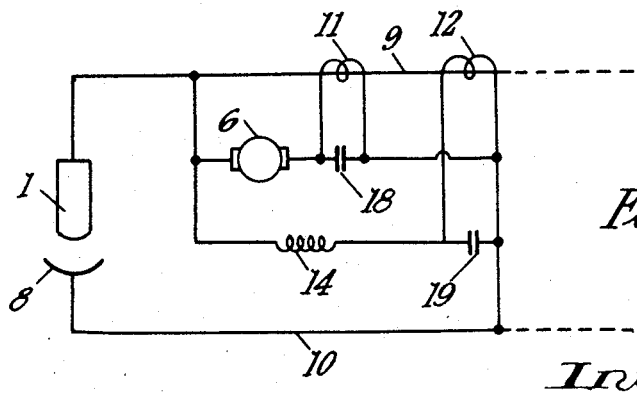
Figure 4:
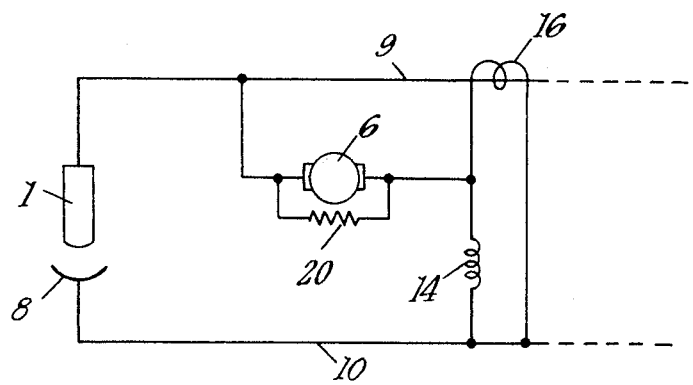
Figure 5:
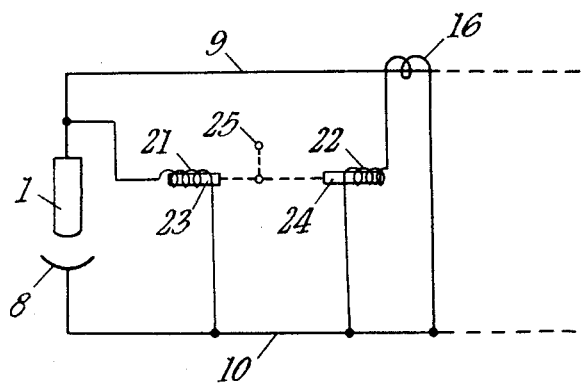
Figure 6:
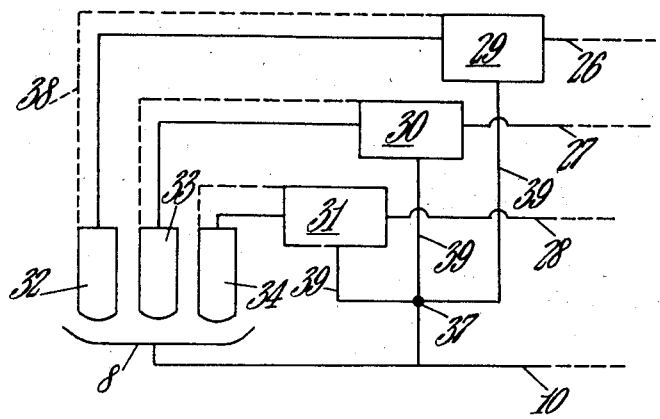
Figure 7:
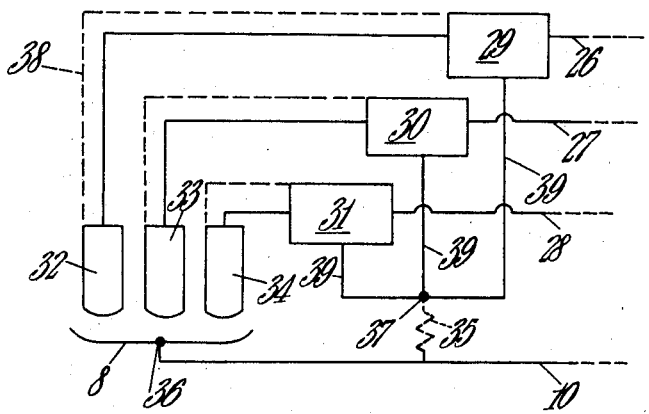
Figure 8:
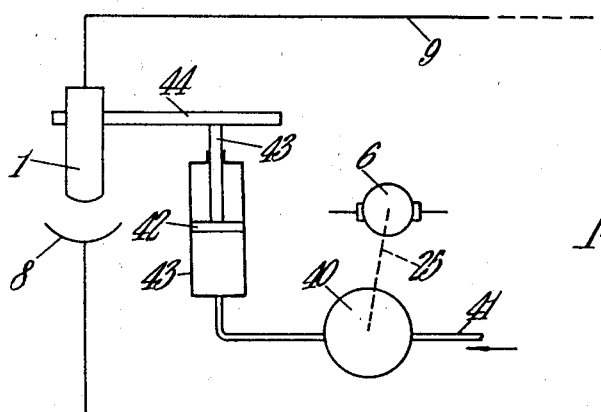

In the accompanying drawings:

Figure 1 shows diagrammatically the circuit of an electrical regulating system according to the present invention applied to an arc furnace, the mechanical connection to the counterbalanced electrode being shown in phantom, Figure 2 shows a modified form of the system shown in Figure 1, with the electrode in this case not counterbalanced, Figures 3 and 4 show further modified forms of the system shown in Figure 1, Figure 5 shows diagrammatically the circuit of an alternative form of regulating system according to the present invention applied to an arc furnace, Figures 6 and 7 show diagrammatically arrangements in which three electrical regulating systems are connected to a three phase supply, and Figure 8 shows a portion of an electrical regulating system according to the present invention applied to an arc furnace in which hydraulic electrode control is used.

In carrying the invention into effect according to one convenient mode by way of example as shown in Figure 1, a regulating system is used to regulate the movement of the electrode of an arc furnace. It will be appreciated that similar systems are provided for other electrodes in the furnace but they are omitted from the drawings for clarity.

The electrode 1 is secured to a cable 2 which passes over pulleys 3 and 4 and around a drum 5 connected to the rotor shaft of a commutator motor 6 and the cable 2 is provided with a counterbalance 7 at its other end. In this way when the motor 6 is providing no torque the electrode 1 is held stationary by the counterbalance 7.

Alternating a current is supplied to the electrode 1 and the shell 8 of the furnace via busbars 9 and 10. Two current transformers 11, 12 are provided on one busbar 9 to provide two independent derivatives of the arc current flowing through the busbar 9. A resistor 13 is connected across the winding of one transformer 11 (armature current transformer) to provide a voltage proportional to the busbar current. One armature connection of the motor 6 is joined to busbar 9 while the other is connected to one end of resistor 13 the other end of which is connected to busbar 10.

The armature of the motor 6 is thus under the influence of the potential across the arc and the potential across resistor 13. Transformer 11 is so wound that when the desired current is flowing through the arc, the potential across resistor 13 is exactly equal and opposite to the potential across the arc with the result that the potential across the armature is zero and no movement is transmitted to the electrode 1.

When the arc current increases above the desired value the potential across resistor 13 predominates to hoist the electrode 1 upwards out of the furnace. This effect is enhanced by the fact that when the busbar current increases the voltage across the arc usually decreases. Conversely when the arc current decreases below the desired value, voltage of opposite phase is applied to the armature and the motor 6 is reversed to lower the electrode 1 into the furnace.

The field winding 14 of the motor 6 is energised by the voltage across the arc which is connected via resistor 15 causing a voltage drop, in shunt with the current transformer 12 (field current transformer). The resistor 15 serves to prevent the field winding 14 from being short circuited on short-circuit conditions of the arc.

With these connections, when the arc voltage predominates over the voltage across resistor 13, the voltage applied to the armature is in plhase with that applied to the field winding; when the voltage across resistor 13 predominates it is out of phase with the field winding and the direction of rotation of the motor is reversed.

It is desirable to enable the motor circuit to be energised alternatively from an auxiliary power supply for positioning the electrode when the furnace power is switched off.

For controlling the value to which the arc current is to be regulated, means are provided (not shown) for varying the arc voltage applied to the armature or for varying the voltage developed across resistor 13. One suitable method is by supplying the armature from a variable-ratio auto-transformer connected across the arc.

In an alternative arrangement as shown in Figure 2, the field current transformer 12 is also provided with a shunt resistor 17 connected in series with the field winding across the arc. The arc voltage and the voltage across resistor 17 are connected in phase assistance so that the field winding is energized by the sum of these voltages.

Although this and the other arrangements as herein described may be used in conjunction with a counterbalanced electrode system as described in connection with Figure 1, they may also be used in conjunction with an unbalanced electrode system.

In this system the cable 2 (Figure 2) is wound around the drum 5 connected to the rotor shaft of the motor 6 and the system is arranged such that a steady state is obtained when the difference between the voltage across the arc and the voltage across resistor 13 applied to the armature circuit provides a rotor-torque just sufficient to counter-balance the weight of the electrode 1 and hold it stationary.

In a further alternative arrangement as shown in Figure 3 the resistors 13, 17 as described with reference to Figure 2 have been replaced by condensers 18 and 19.

This arrangement has the advantage that the continuous drain of current from the arc circuit is in a leading phase so that a leading power factor component is reflected back into the arc circuit, thereby improving the power factor of the furnace installation.

Unlike the first two arrangements, in the arrangement shown in Figure 3 current flows in the armature circuit even when the system is in equilibrium. When the arc voltage and the voltage across condenser 18 are in equilibrium the current flowing in the armature circuit is 90° out of phase with the current flowing in the field circuit (i.e. with the field flux), and in consequence the motor exerts no torque and remains at rest. (This, of course, is if the electrode is counter-balanced. If it is not then torque is supplied at equilibrium to support the electrode.)

When the equilibrium is disturbed so that the phase angle of the current in the field circuit is increased or decreased and vice versa for the armature circuit, the resulting departure from a mutual phase difference of 90° will cause the field and armature to react upon each other to promote motion of the rotor in one direction or the other.

The greatest inter-action of field and armature and thus the greatest torque occurs when their currents are in phase, or are 180° out of phase, with each other. These conditions occur at the extreme departures from equilibrium, i.e. either broken arc or shorted arc and thus the increased torque rapidly restores the system to balance from these extreme conditions.

As a further alternative, not shown, the condensers may be replaced by inductances.

In a still further arrangement as shown in Figure 4, the field winding 14 of the motor 6 is shunted across the current transformer 16 and these two are connected in series with the motor armature having a resistor 20 in shunt, the combination being connected across the busbars 9, 10, to receive the arc voltage.

If desired, one or both current transformers of the arrangements as hereinbefore described may be designed to saturate at a predetermined busbar current so that very high currents encountered at short-circuit conditions of the arc will not adversely affect the components of the system.

In the foregoing description, the armature and field windings of the motor have been described as being directly coupled into the circuit. However, either the armature or the field, or both, may be coupled into the circuit via a transformer which may conveniently be variable to provide a means of adjusting the characteristics of the system.

Although the aforegoing regulating systems have been described with a direct mechanical connection between the motor and the electrode, it is to be understood that the motor may indirectly cause movement of the electrode.

Thus, for example, in the arrangement shown in Figure 8, the motor is incorporated into an hydraulically operated arc furnace in which a fluid under pressure is employed by means of a ram or piston to raise and lower the electrodes, movement of the electrodes being controlled by a valve controlling the fluid pressure operative upon the ram or piston. Referring now to the drawings, motor 6 is drivingly connected to the actuating shaft 25 of a valve 40 which controls the pressure of fluid supplied via conduit 41 operative upon a piston 42 working in a chamber 43, the piston 42 being mechanically connected by arms 43 and 44 to the electrode 1.

In this way, a deviation of the arc furnace from its predetermined electrical conditions causes rotation of the motor 6 and actuation of the valve 40, thereby adjusting the pressure of the fluid operative upon the piston 42 (which pressure normally at conditions of balance is sufficient just to keep electrode 1 stationary), with consequent raising or lowering of the electrode 1 to restore the predetermined electrical conditions.

As a further alternative the commutator motor may be omitted from the system and voltages dependent upon the arc voltage and current utilized to operate another form of electromagnetic device which in turn controls the positioning of parts of apparatus.

For example, as is shown in Figure 5 of the accompanying drawings a regulation system may be provided for an hydraulic system similar to Figure 8 in which the actuating shaft 25 is mechanically connected to two soft iron cores 23, 24 under the influence of two coils 21, 22.

One coil 21 is fed directly from the arc voltage and thus exerts a pull on its core 23 tending to rotate shaft 25 in a clockwise direction and the other coil 22 is fed from a current transformer 16 and tends to rotate the shaft 25 anti-clockwise. At the desired valves of arc current and voltage the two opposing pulls hold the cores 23, 24 and thus the valve actuating shaft 25 in a balanced position. This position corresponds to a predetermined setting of the control valve which by means of the hydraulic system holds the electrodes stationary.

It will be readily apparent to those skilled in the art that any other suitable servo system may be employed to replace the mechanical or hydraulic system where the arc voltage and current directly or indirectly control the servo system in opposite senses to a predetermined equilibrium condition.

An electrode regulator applied to a three phase furnace, as shown in Figures 6 and 7, consists of three regulators 29, 30 and 31 each of which is supplied with one of the phases of a three phase supply by busbar 26, 27 or 28, and each of which is identical to any of the regulators as hereinbefore described except that the internal components of the regulator are not connected to busbar 10 but instead are connected to low potential leads 39 connected to a common regulator star point 37.

Regulator 29 has a mechanical connection, shown diagrammatically as 38, between its electromagnetic device and electrode 32 such that actuation of the electromagnetic device causes movement of the electrode 32. This mechanical connection may be of any suitable direct or indirect form as hereinbefore described. Similar connections are provided between regulation 30 and electrode 33, and between regulator 31 and electrode 34.

The low potential leads 39 of the three regulator circuits are connected together to form a star point 37 for the three phase regulator. In the arrangement shown in Figure 6, this star point 37 is connected directly to the furnace shell such that the three phase regulator and the three phase furnace circuit have a common star point.

It is sometimes desirable, however, for the three phase regulator to have its own separate floating star point; in which case, as is shown in Figure 7, the low potential ends 39 of the regulator circuits are not connected to the furnace bowl but are connected together to form a floating star point 37. Alternatively, as is shown dotted in Figure 7, the star point 37 of the three phase regulator may be connected to the star point 36 of the three phase furnace circuit via a resistance 35.

In any of the regulating systems as hereinbefore described, a condenser (not shown) may be placed in the field circuit so as to reduce the burden on the field current transformer.

Although the present invention has been described and illustrated by way of example only with reference to a number of practical embodiments, it will be apparent to those skilled in the art that various changes and modifications may be made thereto without departing from the spirit of the invention or from the scope of the appended claims.

I claim:
1. In or for an electrical apparatus having at least one electrode supplied by alternating current, the position of which electrode determines the current flowing through and the voltage at the electrode, an electrical regulating system for positioning each electrode of the apparatus in accordance with the variations of the electrode current and voltage at the electrode from predetermined electrical conditions, wherein each regulating system comprises: means for supplying alternating current to said electrode; means located adjacent said electrode whereby an electrical circuit may be completed through said electrode; a commutator motor having an armature circuit and a field circuit; means operatively connecting said commutator motor to said electrode whereby actuation of said motor causes positioning movement of said electrode; first and second current transformers associated with said alternating current supply at said electrode; first impedance means in shunt with said first current transformer, thereby deriving a first voltage dependent upon the electrode current; means for applying the difference between the electrode and first voltages to the armature circuit of the motor; a second impedance means connected to the electrode and thus supplying a second voltage dependant upon the electrode voltage; and means for applying the second voltage and the output of the said second current transformer to the field circuit of the motor, whereby variations of the electrode current and voltage from predetermined values actuate said commutator motor to position said electrode to restore the said predetermined values.

2. In or for electrical apparatus having at least one electrode supplied by alternating current, the position of which electrode determines the current flowing through and the voltage at the electrode, an electrical regulating system for positioning each electrode of the apparatus in accordance with the variations of the electrode current and voltage from predetermined electrical conditions, wherein each regulating system comprises: means for supplying alternating current to said electrode; means located adjacent said electrode whereby an electrical circuit may be completed through said electrode; a commutator motor having an armature circuit and a field circuit; means operatively connecting said commutator motor to said electrode whereby actuation of said motor causes positioning movement of said electrode; first and second current transformers associated with said electrical circuit; first impedance means in shunt with said first current transformers, thereby deriving a first voltage dependant upon the electrode current; means for applying the difference between the electrode and first voltages to the armature circuit of the motor; second impedance means in shunt with said second current transformers, thereby deriving a second voltage dependant upon the electrode current; and means for applying the sum of the electrode and second voltages to the field circuit of the motor, whereby variations of the electrode current and voltage from predetermined values actuate said commutator motor to position said electrode to restore the said predetermined values.

3. An electrical regulating system as claimed in claim 2, wherein said first and second impedance means are predominantly capacitative.

4. In or for electrical apparatus having at least one electrode supplied by alternating current, the position of which electrode determines the current flowing through and the voltage at the electrode, an electrical regulating system for positioning each electrode of the apparatus in accordance with the variations of the electrode current and voltage from predetermined electrical conditions, wherein each regulating system comprises: means for supplying alternating current to said electrode; means located adjacent said electrode whereby an electrical circuit may be completed through said electrode; a commutator motor having a field circuit and an armature circuit which includes a resistance in shunt with the armature connections; means operatively connecting said commutator motor to said electrode whereby actuation of said motor causes positioning movement of said electrode; a current transformer associated with the supply to the electrode; means connecting said current transformer to the field circuit of the motor to form a shunt combination therewith; and means for applying the electrode voltage to the series combination of the armature circuit and the shunt combination of the current transformer and the field circuit, whereby variation of the electrode current and voltage from predetermined values actuate said commutator motor to position said electrode to restore the said predetermined values.

5. In or for electrical apparatus having at least one electrode supplied by alternating current, the position of which electrode determines the current flowing through and the voltage at the electrode, an electrical regulating system for positioning each electrode of the apparatus in accordance with the variations of the electrode current and voltage from predetermined electrical conditions, wherein each regulating system comprises: means for supplying alternating current to said electrode means located adjacent said electrode whereby an electrical circuit may be completed through said electrode; an armature; first and second operating windings arranged to influence said armature in opposition; means operatively connecting said armature to said electrode whereby movement of said armature causes positioning movement of said electrode; a current transformer associated with said electrical circuit; means for supplying a voltage dependent upon the electrode voltage to said first operating winding; and means connecting said current transformer to said second operating winding, whereby variations of the electrode current and voltage from predetermined values actuate said armature to position said electrode to restore the said predetermined values.

6. An electrical regulating system as claimed in claim 5, wherein said armature is operatively connected to the control valve of an hydraulic system controlling the position of the electrode.

7. In or for electrical apparatus having at least three electrodes each supplied by one phase of a three-phase alternating current supply, the position of each electrode determining the current flowing through and the voltage at that electrode, an electrical regulating system for positioning separately the electrodes in accordance with the variations of the electrode currents and voltages from predetermined values comprising: means located adjacent the said electrodes whereby electrical circuits may be completed through said electrodes to form a star point for the alternating current supply; an electromagnetic device operatively connected to each electrode; current derivative means for deriving a controlling electrical quantity dependent upon the electrode current for each phase, each current derivative means being electrically connected to the appropriate electromagnetic device; voltage derivative means for deriving a controlling electrical quantity dependent upon the electrode voltage for each phase, each voltage derivative means being electrically connected to the appropriate electromagnetic device; and means connecting the electromagnetic devices and the derivative means to form a common regulator star point, whereby variations of each electrode supply current and voltage from predetermined electrical values actuate the appropriate electromagnetic device to drive its associated electrode to restore the said predetermined electrical values.

8. An electrical regulating system as claimed in claim 7, wherein the said star point of the three phase alternating current supply is electrically connected to the regulator star point.

9. An electrical regulating system as claimed in claim 7 wherein the said star point of the three phase alternating current supply is connected through a resistance to the regulator star point.

10. In or for electrical apparatus having at least one electrode supplied by alternating current, the position of which electrode determines the current flowing through and the voltage at the electrode, an electrical regulating system for positioning the electrode in accordance with the variations of the electrode current and voltage from predetermined values, wherein a difference controlling electrical quantity is produced by the connection in phase opposition of an alternating current controlling electrical quantity dependent upon the current at the electrode and one dependent upon the voltage at the electrode and a sum controlling electrical quantity is produced by the connection in phase assistance of two such alternating current controlling electrical quantities, the said difference and sum controlling electrical quantities being applied to an electromagnetic device so that the said variations actuate the electromagnetic device to adjust the position of the electrode and thereby restore the predetermined values of the electrode current and voltage.

11. An electrical regulating system as claimed in claim 10, wherein the said electromagnetic device comprises a commutator motor having an armature circuit and a field winding, the said armature circuit being energized by the said difference controlling electrical quantity and the said field winding being energized by the said sum controlling electrical quantity.

12. An electrical regulating system comprising: an electrode; means for supplying alternating current to said electrode; means located adjacent said electrode whereby an electrical circuit may be completed through said electrode; an electromagnetic device operatively connected to the said electrode; current derivative means for deriving at least one alternating current controlling electrical quantity dependent upon the electrode current; voltage derivative means for deriving at least one alternating current controlling electrical quantity dependent upon the electrode voltage; means for supplying the difference between controlling quantities from the current and voltage derivative means to the said electromagnetic device; and means for supplying the sum of controlling quantities from the current and voltage derivative means to the said electromagnetic device, whereby variations of the current supplied to, and the voltage at, the said electrode, from predetermined electrical values, actuate the said electromagnetic device to move the electrode to restore the said predetermined electrical values.

References Cited in the file of this patent

UNITED STATES PATENTS 1,241,574    Sykes  _____ Oct. 2, 1917